United States Patent
Ohata et al.

(10) Patent No.: US 7,866,306 B2
(45) Date of Patent: Jan. 11, 2011

(54) CONTROL APPARATUS OF EGR CONTROL VALVE

(75) Inventors: Eiichiro Ohata, Kasama (JP); Shiro Yamaoka, Hitachi (JP); Yoshihiro Sukegawa, Hitachi (JP); Hiroaki Hoshika, Hitachiohmiya (JP); Kaori Kashio, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 496 days.

(21) Appl. No.: 11/873,601

(22) Filed: Oct. 17, 2007

(65) Prior Publication Data

US 2009/0223495 A1   Sep. 10, 2009

(30) Foreign Application Priority Data

Oct. 18, 2006   (JP) .............................. 2006-283240

(51) Int. Cl.
*F02B 33/00* (2006.01)
*F02B 33/44* (2006.01)
*F02B 47/08* (2006.01)
*F02M 25/07* (2006.01)

(52) U.S. Cl. ............................ 123/568.21; 123/568.11; 123/568.15; 123/568.17; 123/568.18; 123/568.2; 123/568.22; 123/568.26; 60/605.1; 60/605.2

(58) Field of Classification Search ............. 123/568.11, 123/568.19, 568.21; 60/605.1, 605.2, 599; 701/108

See application file for complete search history.

(56) References Cited

U.S. PATENT DOCUMENTS

| | | | | |
|---|---|---|---|---|
| 5,003,781 | A * | 4/1991 | Shibata et al. | 60/600 |
| 6,152,118 | A * | 11/2000 | Sasaki et al. | 123/568.21 |
| 6,298,835 | B1 * | 10/2001 | Horie et al. | 123/568.21 |
| 6,367,256 | B1 * | 4/2002 | McKee | 60/605.2 |
| 6,457,461 | B1 * | 10/2002 | Romzek | 123/568.16 |
| 6,564,784 | B1 * | 5/2003 | Onodera et al. | 123/568.12 |
| 6,659,090 | B2 * | 12/2003 | Sisken | 123/568.11 |
| 6,668,792 | B2 * | 12/2003 | Yamauchi et al. | 123/295 |
| 6,742,335 | B2 * | 6/2004 | Beck et al. | 60/605.2 |
| 6,782,326 | B2 * | 8/2004 | Takamoto et al. | 702/48 |
| 7,155,332 | B2 * | 12/2006 | Yamada et al. | 701/108 |
| 7,182,075 | B2 * | 2/2007 | Shahed et al. | 123/568.21 |

FOREIGN PATENT DOCUMENTS

JP   2004-100508 A   4/2004

* cited by examiner

*Primary Examiner*—Stephen K Cronin
*Assistant Examiner*—Raza Najmuddin
(74) *Attorney, Agent, or Firm*—Crowell & Moring LLP

(57) ABSTRACT

A control apparatus of an EGR control valve has an EGR control valve has an exhaust gas recirculation passage to circulate exhaust gas of an combustion engine from an exhaust gas passage to an intake air passage. A measurement unit measures a flow rate of EGR gas flowing in the exhaust gas recirculation passage, and a controller receives an input from the measurement unit and closes the EGR control valve if the EGR-gas flow rate is smaller than a predetermined threshold value when the EGR gas is flowing from the exhaust side to the intake side of the internal combustion engine.

8 Claims, 8 Drawing Sheets

FIG. 8
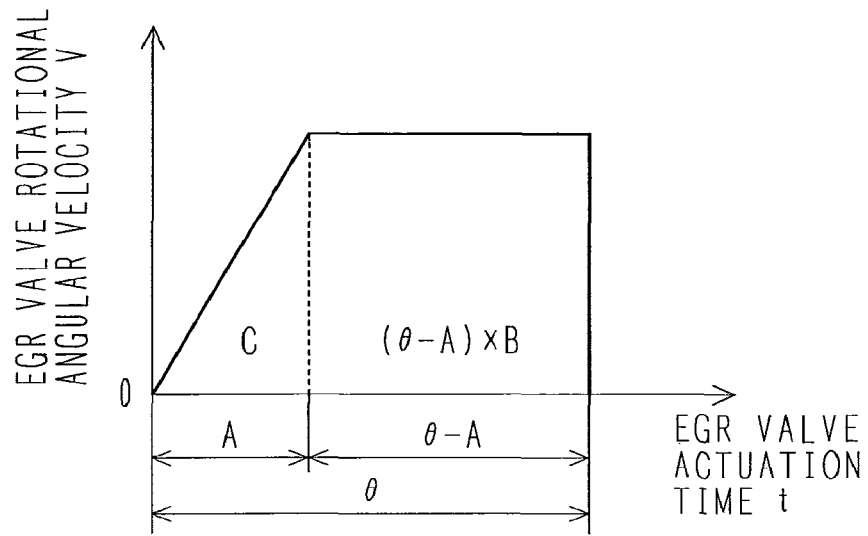
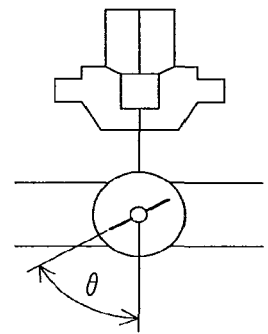
FIG. 9
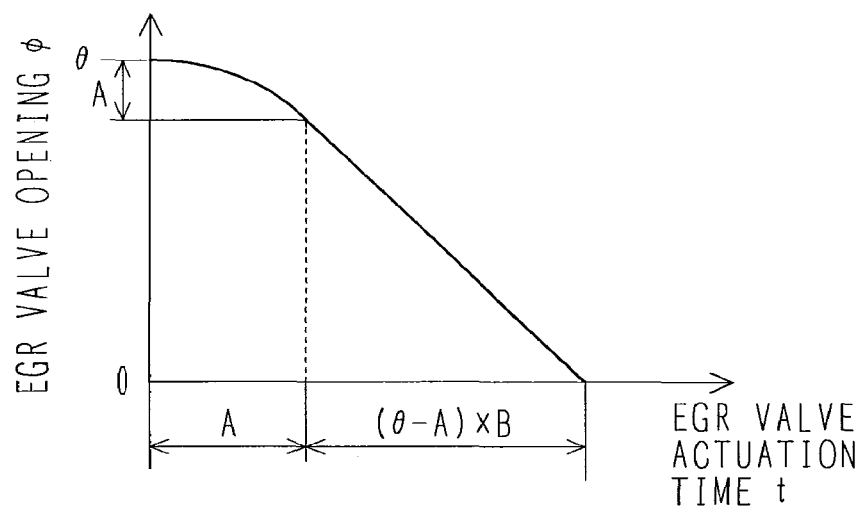

CONTROL APPARATUS OF EGR CONTROL VALVE

BACKGROUND OF THE INVENTION

1. Field of the Invention

The present invention relates to a control apparatus of an EGR (exhaust gas recirculation) control valve.

2. Description of the Related Art

To reduce the amount of nitrogen oxide discharge in exhaust gas of an internal combustion engine, it is effective to restrain the combustion temperature through the exhaust gas recirculation (EGR) with which exhaust gas is circulated to the intake side. Hereafter, the exhaust gas recirculated to the intake side by the EGR is referred to as "EGR gas."

For effective operation of the EGR, it is necessary that the EGR gas flows from the exhaust side toward the intake side without a back flow. Therefore, the pressure on the exhaust side needs to be higher than that on the intake side. With an internal combustion engine utilizing a supercharger, however, the pressure on the intake side becomes higher than that on the exhaust side. A technique to provide an EGR control valve in a passage for exhaust gas circulation, detect the EGR-gas pressure, and close the EGR control valve if a back flow occurs is disclosed in JP-A-2004-100508.

SUMMARY OF THE INVENTION

The above-mentioned conventional technique detects an EGR-gas back flow and then performs valve close control of an EGR valve. Therefore, if the EGR-gas flow direction changes from forward flow to back flow, a back flow condition will last not only for a response delay time of a detector but also for the judgment time by calculation processing and the actuation time of the EGR control valve. If the EGR gas flows backward, combustion conditions in the internal combustion engine become different from those assumed in a control apparatus, preventing appropriate air-fuel ratio, etc. from being achieved. This may adversely affect the exhaust of the internal combustion engine, etc. To prevent a back flow, therefore, it is necessary to restrict the conditions for performing exhaust gas recirculation to such operating conditions that do not allow a back flow to easily take place. Accordingly, there arises a subject that the exhaust gas recirculation cannot effectively be utilized.

As means for solving the subject, there is provided an EGR control valve comprising: an EGR control valve which is provided in an exhaust gas recirculation passage to circulate exhaust gas of an internal combustion engine from an exhaust gas passage to an intake air passage; a measurement element which measures the flow rate of EGR gas flowing in the exhaust gas recirculation passage; and a control element which receives an input from the measurement element and, if the EGR-gas flow rate is smaller than a predetermined threshold value when the EGR gas is flowing from the exhaust side to the intake side of the combustion engine, closes the EGR control valve.

In accordance with the present invention, the EGR-gas back flow can be prevented, thus making it possible to increase the number of operating conditions for performing exhaust gas recirculation and the amount of EGR gas to be recirculated. Accordingly, it becomes possible to reduce hazardous components in the exhaust gas without reducing the power of the internal combustion engine.

BRIEF DESCRIPTION OF THE DRAWINGS

FIG. 8 is a diagram showing an example of control characteristics of an EGR control valve.

FIG. 9 is a diagram showing an example of control characteristics of an EGR control valve.

DETAILED DESCRIPTION OF THE PREFERRED EMBODIMENTS

Embodiments of the present invention will be explained below with reference to the accompanying drawings.

First Embodiment

Figure 1:
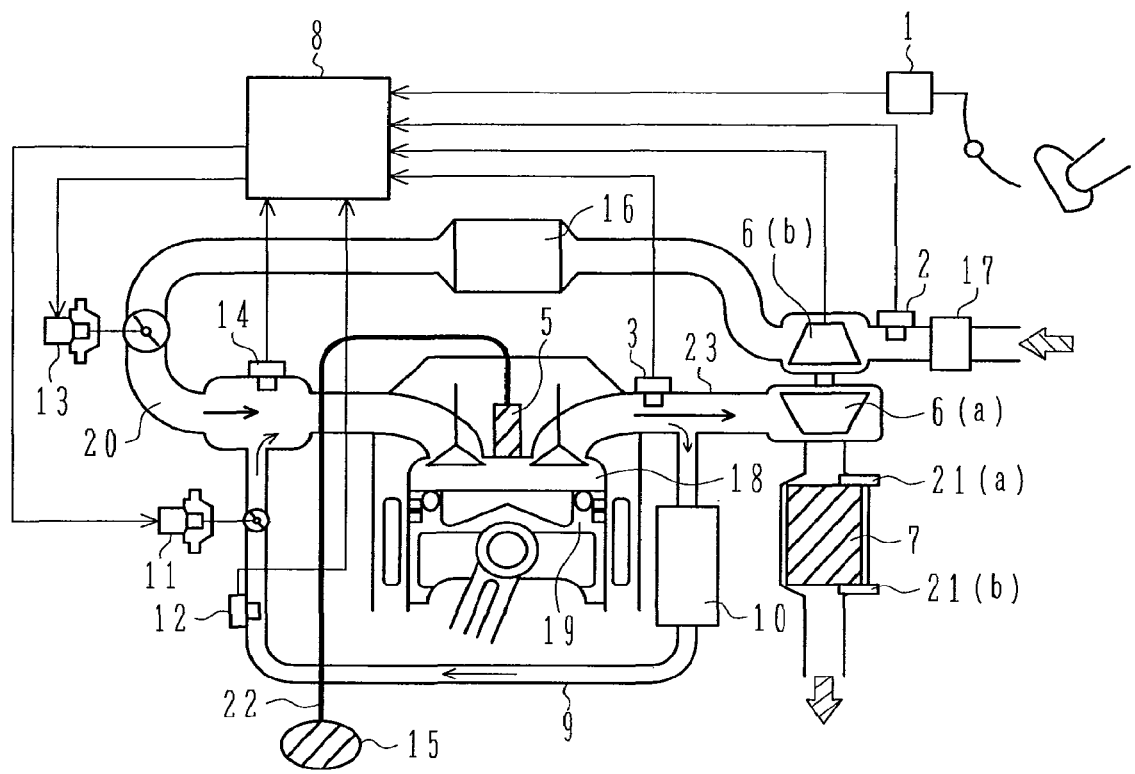
FIG. 1 is a block diagram of an engine control apparatus according to a first embodiment of the present invention.

FIG. 1 is a block diagram of an engine control apparatus according to a first embodiment of the present invention. On the intake side of an engine 19, an air cleaner 17, an airflow sensor 2, a supercharger compressor 6B, an intercooler 16, a throttle valve 13 for controlling the amount of intake air, an intake pipe 20, and an injector 5 are provided from the upstream.

A supercharger is provided with a turbine 6A provided in the exhaust gas passage and a compressor 6B provided in the intake air passage. When the turbine 6A is activated by exhaust gas and then the compressor 6B connected thereto is activated, the compressor 6B compresses the intake air to raise the intake pressure. That is, a part of kinetic energy of the exhaust gas can be recovered by the supercharger. Further, the intercooler 16 cools the air compressed by the compressor 6B to restrain the expansion of the intake air and improve the compression efficiency.

The amount of air inhaled by the engine 19 is controlled by the throttle valve 13. The throttle valve 13 controls the amount of intake air by controlling the angle of a butterfly valve provided in the intake air passage. When performing control according to the present embodiment, preferably the throttle valve 13 is an electronically-controlled throttle valve. The electronically-controlled throttle valve actuates the throttle valve by means of an electric actuator, such as a motor, and therefore provides a favorable response.

A control unit (hereafter referred to as "ECU") 8 receives an input of a detection value of the amount of intake air by the airflow sensor 2 and controls the opening of the throttle valve 13 so that the amount of intake air agrees with a required amount of intake air determined by the opening of an accelerator pedal and the actuating condition of an auxiliary unit.

In accordance with the present embodiment, the intake pipe 20 is provided with an intake pressure sensor 14. By detecting the pressure in the intake pipe 20 by means of the intake pressure sensor 14, the following suitable control of the amount of intake air is enabled.

An exhaust pipe 23 of the engine 19 is provided with an exhaust pressure sensor 3. Further, the exhaust side of the engine 19 is provided with an EGR flow channel 9 which recirculates the exhaust gas from the exhaust pipe 23 to the intake pipe 20. The EGR flow channel 9 is provided with an EGR cooler 10 which cools the exhaust gas (hereafter referred to as "EGR gas") to be recirculated and an EGR control valve 11 which controls the EGR-gas flow rate. Further, an EGR flow sensor 12 for detecting the EGR flow rate is provided in the EGR flow channel 9.

The ECU 8 determines the combustion mode, controlled variables, etc. of the engine 19 according to user demands such as an accelerator opening α and brake conditions, vehicle conditions such as the vehicle speed, and engine operating conditions such as the engine cooling water temperature and the exhaust gas temperature. The ECU 8 then controls the opening of the above-mentioned throttle valve 13 and the amount of fuel injection of the injector 5. The injector 5 according to the present embodiment injects fuel directly into a combustion chamber 18.

More specifically, the ECU 8 calculates a target engine torque based on an opening signal α of an accelerator opening sensor 1 and calculates the amount of fuel injection of a fuel injection valve 5 based on the target engine torque. Further, the ECU 8 corrects the calculated amount of fuel injection by use of at least one of output values: an opening signal $\theta_{tp}$ of the throttle valve 13, an opening signal $\theta_{egr}$ of the EGR control valve 11, and a charging pressure $P_{tin}$ of the compressor 6B.

Figure 2:
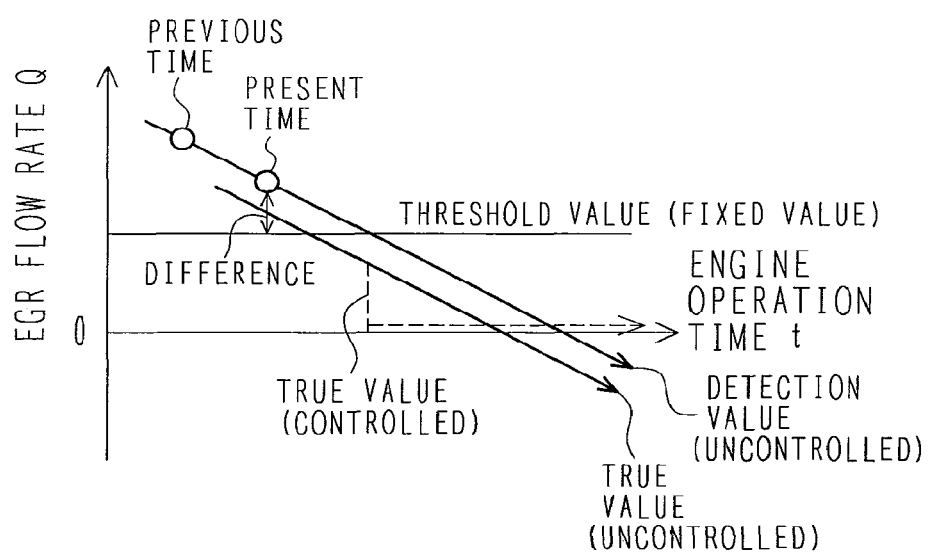
FIG. 2 is a diagram showing control details according to the first embodiment of the present invention.
Figure 5:
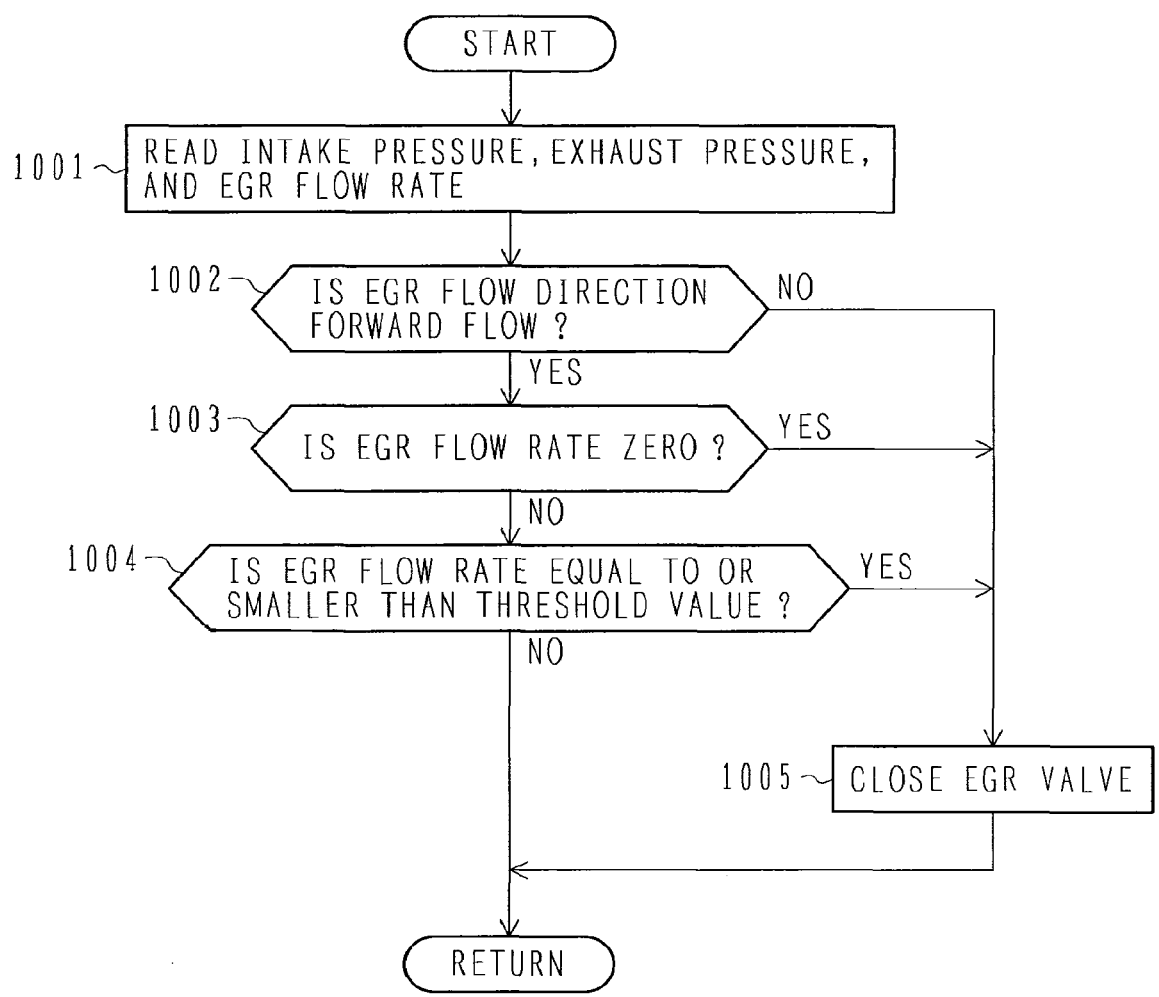
FIG. 5 is a flow chart showing control details according to the first embodiment of the present invention.

FIG. 5 shows a control flow chart according to the present embodiment. FIG. 2 shows the variation of the EGR-gas flow rate (hereafter referred to as "EGR flow rate") through control according to the present embodiment.

Referring to FIG. 2, the horizontal axis is assigned an operation time of the engine 19 and the vertical axis the EGR flow rate. When the EGR gas flows from the exhaust side to the intake side (forward flow condition), the EGR flow rate is positive; when it flows vice versa (back flow condition), the EGR flow rate is negative. FIG. 2 shows an operating condition of the engine 19, in which a positive EGR flow rate (forward flow condition) gradually decreases and, if control according to the present embodiment is not performed, a back flow condition occurs.

When an EGR valve control apparatus according to the present embodiment is activated, the control apparatus periodically repeats measurement, calculation, and control signal transmission shown in FIG. 5.

The EGR valve control apparatus first reads a detection value of the intake pressure sensor 14 provided in the intake pipe 20, a detection value of the exhaust pressure sensor 3 provided in the exhaust pipe 23, and a value of the EGR flow sensor 12 provided in the EGR flow channel 9 (Step 1001).

Then, the control apparatus calculates a difference between the detection value of the intake pressure sensor 14 and that of the exhaust pressure sensor to judge the EGR-gas flow direction. Specifically, if the detection value of the intake pressure sensor 14 (intake pressure) is lower than that of the exhaust pressure sensor 3 (exhaust pressure), it is possible to judge a forward flow condition where the EGR gas is flowing from the exhaust side to the intake side. On the other hand, if the detection value of the intake pressure sensor 14 (intake pressure) is higher than that of the exhaust pressure sensor 3 (exhaust pressure), it is possible to judge a back flow condition where the EGR gas is flowing from the intake side to the exhaust side (Step 1002). Therefore, if the intake pressure is higher than the exhaust pressure, the control apparatus closes the EGR control valve 11 (Step 1005), thus preventing an EGR-gas back flow.

On the contrary, if a forward flow condition is judged in Step 1002, the control apparatus proceeds with the next step (Step 1002). In this case, if the detection value of the EGR flow rate detected by the EGR flow sensor 12 is zero, it is possible to judge that the EGR gas is not flowing. Then, if the detection value of the EGR flow rate is zero, the control apparatus closes the control valve (Step 1003). "A zero detection value of the EGR flow rate" means not only that the detection value of the EGR flow sensor is exactly zero but also that the detection value of the EGR flow rate falls within a predetermined range (0±α or less) in which it can practically be considered as zero from a viewpoint of controlling the EGR flow rate.

On the other hand, if the detection value of the EGR flow rate by the EGR flow sensor 12 is not zero, a forward flow condition is judged and then control is transferred to the next step 1004 (Step 1003). In this case, if the EGR flow rate is smaller than the detection value of the EGR flow sensor 12 by a predetermined threshold value or less, the control apparatus closes the EGR control valve 11 (Step 1004) because it is judged that the EGR flow rate is close to a back flow condition.

In accordance with the above control, as shown by a dotted line of FIG. 2, it is possible to close the EGR control valve 11 when the detection value of the EGR flow rate falls below a predetermined threshold value to control the EGR flow rate to practically zero. This makes it possible to prevent a back flow from the intake side to the exhaust side even if the magnitude relation between pressures on the intake and exhaust sides is reversed afterwards. The present embodiment is advantageous in that control details are simpler than those of other embodiments later mentioned.

The threshold value used here will be determined through an experiment. For example, an experiment for operating the engine 19 is performed based on a plurality of threshold values. Then, it becomes possible to calculate an average of back flow values occurring for each threshold value, and adopt a threshold value with which the average becomes the smallest.

Second Embodiment

Figure 6:
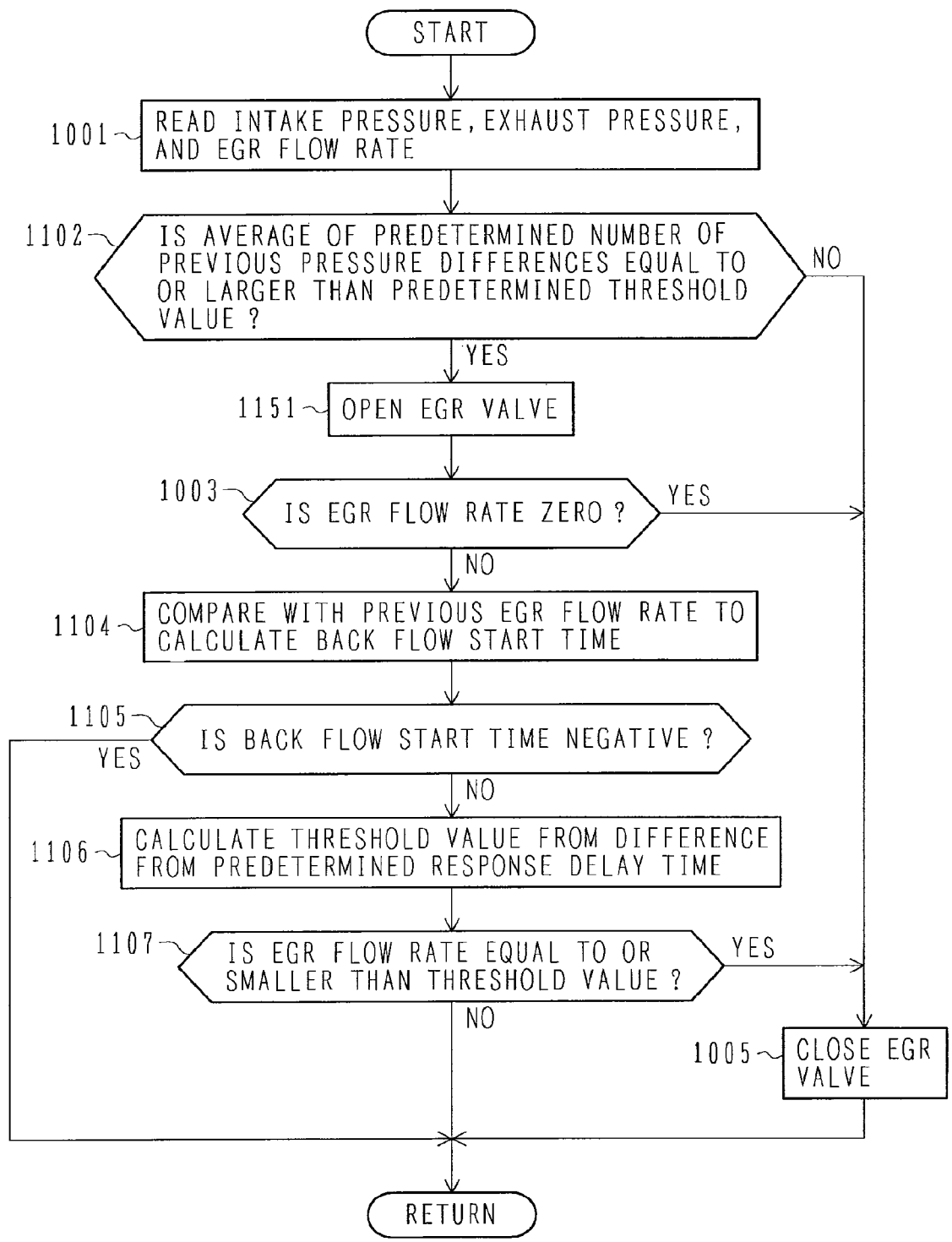
FIG. 6 is a flow chart showing control details according to the second embodiment of the present invention.

A second embodiment of the present invention will be explained below with reference to FIGS. 3 and 6. A prerequisite engine control system is basically the same as that of the first embodiment as shown in FIG. 1.

The above-mentioned first embodiment uses a predetermined fixed value as a threshold value for determining whether or not the EGR control valve is closed. However, the present embodiment is characterized in that it predicts a timing at which the EGR flow rate changes from forward flow to back flow based on the variation of a measured EGR flow rate, calculates a time period necessary to interrupt the EGR gas flow from the predicted timing, and calculates a threshold value used to determine whether or not the EGR control valve is closed. Therefore, except for the method of determining a threshold value, the configuration and effect of the present embodiment are the same as those of the first embodiment. The second embodiment will be explained below centering on differences from the first embodiment.

In accordance with the present embodiment, when the EGR valve control apparatus is activated, the control apparatus periodically repeats measurement, calculation, and control signal transmission.

The control apparatus first reads a detection value of the intake pressure sensor 14 provided in the intake pipe 20, a detection value of the exhaust pressure sensor provided in the exhaust pipe, and a value of the EGR flow sensor 12 provided in the EGR flow channel 9 (Step 1001).

Then, the control apparatus calculates a difference between the detection value of the intake pressure sensor 14 and that of the exhaust pressure sensor to judge the EGR-gas flow direction (Step 1102). Here, the control apparatus calculates an average of pressure differences at a plurality of timings, not a result of single measurement of pressure difference, and then determines whether the EGR control valve is opened or closed depending on whether or not the average is equal to or greater than a predetermined threshold value. Specifically, the pressure on the intake side is larger than the pressure on the exhaust side by a predetermined value or more in terms of an average for a plurality of timings, it is assumed that a back flow condition continues and therefore the control apparatus closes the EGR control valve (Step 1005). Conversely, if an average of differences between pressures on the intake and exhaust sides is smaller than a predetermined threshold value, the control apparatus judges a forward flow condition, starts opening the EGR control valve (Step 1151), and then proceeds with the next step (Step 1102).

Then, if the detection value of the EGR flow rate by the EGR flow sensor 12 is zero, the control apparatus judges that the EGR gas is not flowing and then closes the control valve (Step 1003). On the other hand, if the detection value of the EGR flow rate by the EGR flow sensor 12 is not zero, the control apparatus judges a forward flow condition and then proceeds with the next step (Step 1003). Since processing from Steps 1001 to 1003 is the same as that of the first embodiment, detailed explanation will be omitted.

In Step 1104, the control apparatus approximates variation of the EGR flow rate with time by use of a specific function based on a detection value of the EGR flow rate at a plurality of different timings. For example, the control apparatus performs recursive calculation by use of detection values of previous EGR flow rates and a detection value of the present EGR flow rate, and then approximates variation of the EGR flow rate with time by use of a linear expression.

Then, the control apparatus calculates a back flow start time at which the EGR flow rate changes from forward flow to back flow based on the approximate expression. Specifically, the control apparatus calculates a time instant when the EGR flow rate approximated by the linear expression becomes zero.

Then, the control apparatus proceeds with Step 1105 to judge a possibility of the back flow occurrence. If the back flow start time calculated in Step 1104 is negative, the inclination of the approximate expression is positive, i.e., on the increase. In this case, it is thought that the EGR flow rate is increasing and therefore it can be judged that there is no possibility of the back flow occurrence at present. Therefore, in Step 1105, the control apparatus determines whether the calculated back flow start time is negative or not. If it is negative, the control apparatus terminates processing and then returns to the start (Step 1105); otherwise, the control apparatus judges that there is a possibility of the back flow occurrence at present and then proceeds with the next step 1106 (Step 1105).

If the EGR flow rate changes very little or remains almost unchanged, the back flow start time obtained as mentioned above becomes very large, which may cause an error in a calculation result. Then, if the found back flow start time is larger than a predetermined threshold value, it is desirable to hold the value of the back flow start time at the time when Step 1105 was last performed.

In Step 1106, the control apparatus calculates a threshold value from a difference between the back flow start time and a predetermined response delay time. Here, the response delay time denotes a total of delay factors including a delay of sensor detection, a delay due to a valve actuation time since the EGR control valve 11 is actuated until it closes, and a delay due to calculation time involved in detection, judgment, and actuation. Therefore, the control apparatus obtains a time instant which is earlier than the calculated back flow start time by the response delay time, and uses the value of the above-mentioned approximate expression at the obtained time as a threshold value.

It may be possible to add not only the above-mentioned delay time inevitably occurring in a control system configuration but also a margin time to the above-mentioned response delay time. It may also be possible to use a sum of a threshold value calculated using an approximate expression and a predetermined margin as a threshold value. By taking measures in this way, an EGR-gas back flow can be prevented even with a large change rate of the EGR flow rate and a low accuracy of the approximate expression.

In Step 1107, the control apparatus determines whether or not the detection value of the EGR flow rate by the EGR flow sensor 12 is equal to or smaller than the threshold value calculated in Step 1106. If the detection value of the EGR flow rate is equal to or smaller than the threshold value, the control apparatus closes the EGR control valve 11 (Step 1005) because it can be judged that a back flow condition is close. On the other hand, if the detection value of the EGR flow rate is larger than the threshold value, the control apparatus terminates processing and then returns to the start (Step 1107).

Figure 3:
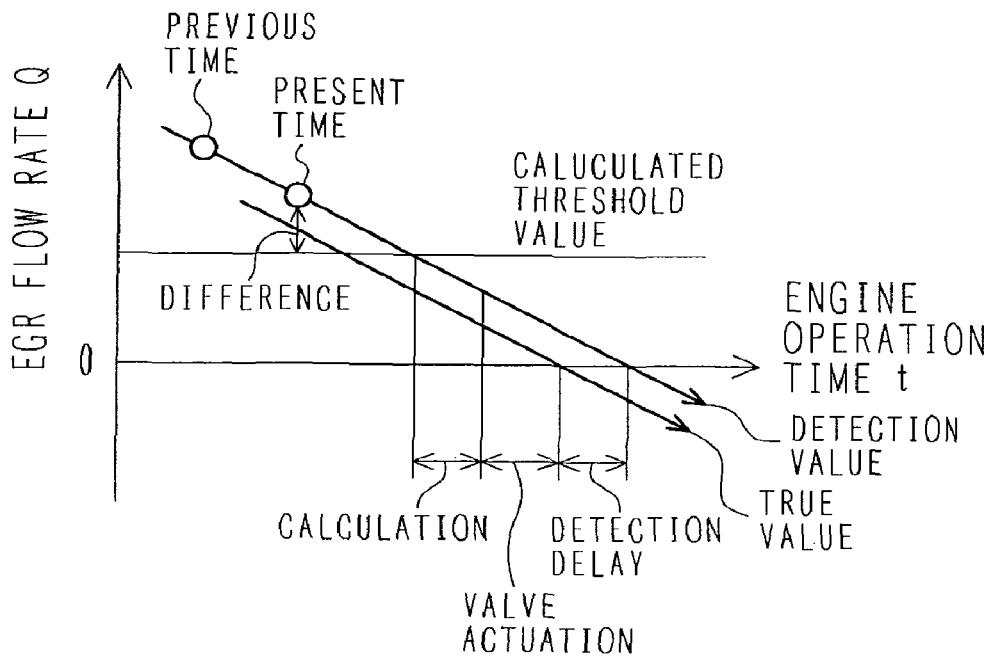
FIG. 3 is a diagram showing control details according to a second embodiment of the present invention.

In accordance with the above control, it is possible to close the EGR control valve 11, when the detection value of the EGR flow rate falls below a predetermined threshold value, to control the EGR flow rate to practically zero, as shown in FIG. 3. This makes it possible to prevent a back flow from the intake side to the exhaust side even if the magnitude relation between pressures on the intake and exhaust sides is reversed afterwards. In accordance with the present embodiment, the accuracy for judging the back flow occurrence has been improved in comparison with the first embodiment. Further, the EGR gas can be recirculated at timing closer to the back flow occurrence, making it possible to expand an operating range in which the exhaust gas can be improved using the EGR with the engine 19.

Third Embodiment

A third embodiment of the present invention will be explained below with reference to FIGS. 4 and 7. A prerequisite engine control system is basically the same as that of the first and second embodiments as shown in FIG. 1.

The present embodiment is characterized in a method of calculating a threshold value for determining whether or not the EGR control valve is closed in thorough consideration of the time necessary for the operation of the EGR control valve. Therefore, except for the method of determining a threshold value, the configuration and effect of the present embodiment are the same as those of the first and second embodiments. The third embodiment will be described below centering on differences from the first and second embodiments.

Figure 4:
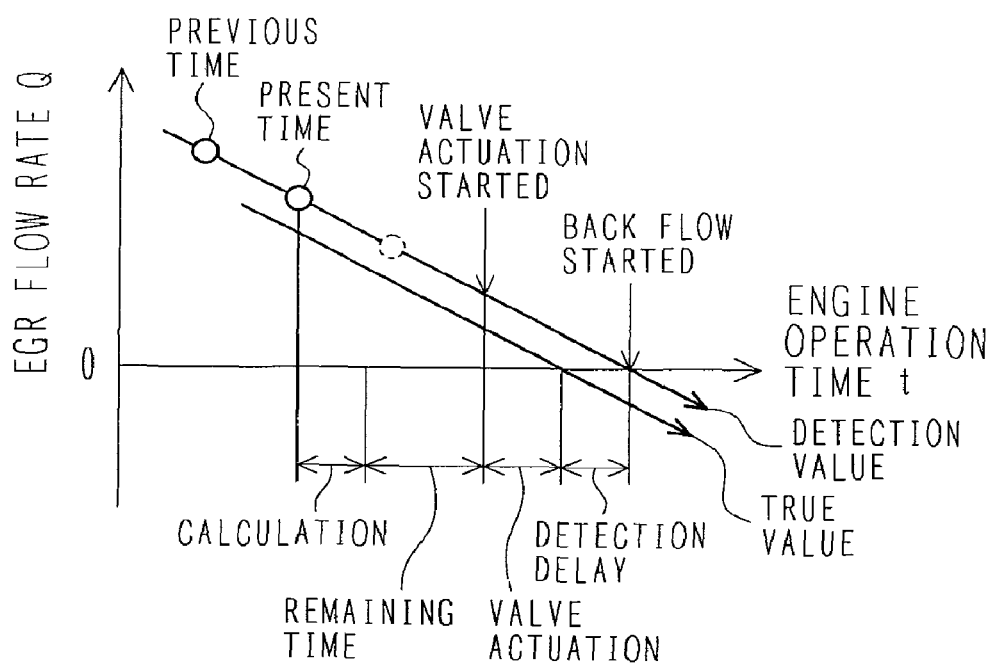
FIG. 4 is a diagram showing control details according to a third embodiment of the present invention.
Figure 7:
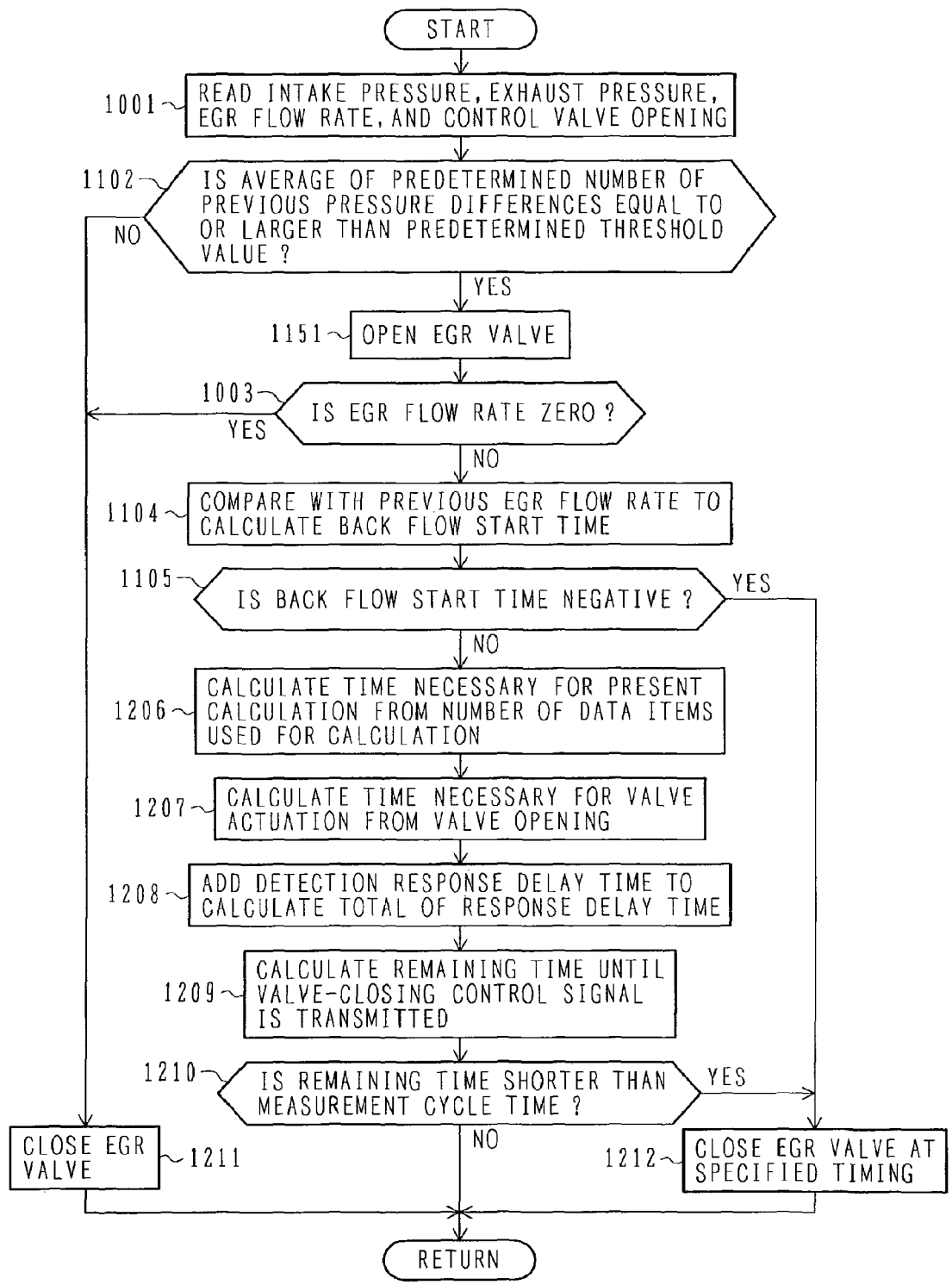
FIG. 7 is a flow chart showing control details according to the third embodiment of the present invention.

FIG. 4 shows an example of a control method in an apparatus according to the present invention, and FIG. 7 shows a detailed control flow chart.

In accordance with the present embodiment, when the EGR valve control apparatus is activated, the control apparatus periodically repeats measurement, calculation, and control signal transmission. Processing from Steps 1001 to 1105 is the same as that for the second embodiment. In Step 1105, if the back flow start time is not negative, the control apparatus judges that there is a possibility of the back flow occurrence at present and then proceeds with the next step 1206.

In Step 1206, the control apparatus calculates a calculation time necessary for the present calculation based on the number of data items used for a predetermined calculation.

Then, in Step 1207, the control apparatus calculates a time period (valve actuation time) necessary for actuation from the present valve opening to a target valve opening based on a measured valve opening θ of the EGR control valve 11. In the calculation, the control apparatus calculates a necessary time period at each of accelerative and constant-speed operations during actuation in consideration of operating characteristics of a motor which actuates the EGR control valve 11.

A time C at acceleration and an actuation opening A during the time C are constant values, and an actuation time at a constant angular velocity B is calculated by (θ−A)×B. A relation between the actuation time and the rotational angular velocity of the EGR valve and a relation between the actuation time and the valve opening of the EGR valve are shown in FIGS. 8 and 9, respectively. If the control valve is not of the butterfly type, the operating time is calculated according to operating characteristics of an applied valve.

Then, the control apparatus proceeds with Step 1208 and then totals a detection delay time of the sensor predetermined by verification, a calculated operation time, and the above-mentioned valve actuation time to calculate the total response delay time. The control apparatus calculates a difference between the total response delay time and the back flow start time obtained in Step 1104, and uses the difference value as a remaining time.

When α is the above-mentioned remaining time; β, a predicted time from measurement to back flow start time; γ, a time necessary to actuate the control valve; δ, a time necessary to calculate a threshold value; and η, a measurement response delay time of the measurement element; the control apparatus calculates α=β−γ−δ−η.

If the remaining time is shorter than a measurement cycle time, the control apparatus judges that the possibility of the back flow occurrence by next judgment is high and, when the remaining time becomes zero, closes the EGR control valve 11 (Step 1212).

If the remaining time is not shorter than a measurement cycle time, the control apparatus judges that the possibility of the back flow occurrence by next judgment is low, terminates processing, and proceeds with next measurement (Step 1210).

In accordance with the present embodiment, control details are more precise than those of the first and second embodiments because of the consideration of flow rate change and response delay time characteristics. Therefore, the present invention is advantageous in that the accuracy for judging an EGR gas back flow is improved.

Fourth Embodiment

Figure 10:
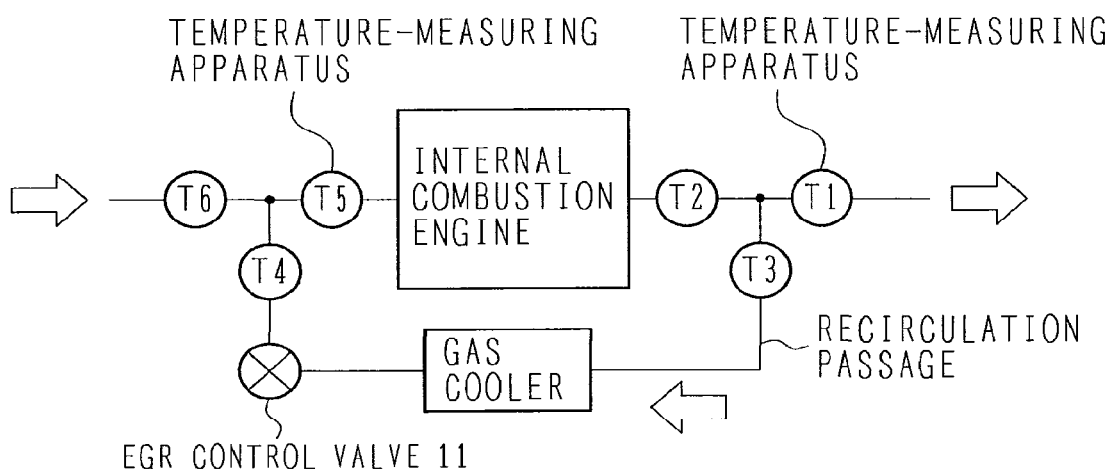
FIG. 10 is a diagram showing a method of measuring the EGR-gas flow rate according to a fourth embodiment of the present invention.
Figure 11:
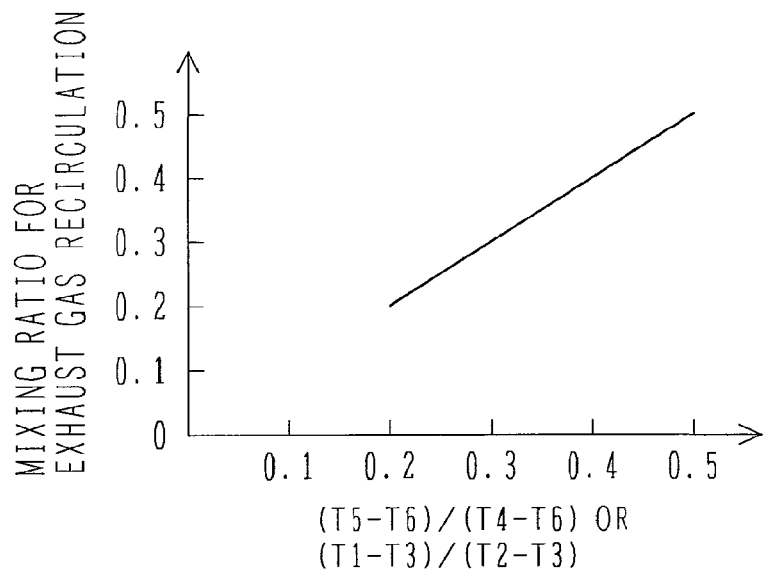
FIG. 11 is a diagram showing a method of measuring the EGR-gas flow rate according to the fourth embodiment of the present invention.

Still another embodiment of the present invention will be explained below with reference to FIGS. 10 and 11.

In accordance with the first to third embodiments, the EGR flow rate is detected using the EGR flow sensor 12 which detects the EGR flow rate. In accordance with the present embodiment, the EGR flow direction and flow rate are measured by measuring the temperature of the gas flowing in the intake pipe, the exhaust pipe, and the EGR pipe. For the determination whether or not the EGR control valve 11 is closed, processing shown in any of the first to third embodiments is used and therefore relevant explanation is omitted.

Two different gases T4 and T6 having different temperatures are mixed. A relative value of the mixture gas at temperature T5, i.e., (T5−T6)/(T4−T6), almost agrees with the mixing ratio. An EGR flow rate is obtained by calculating a product of the mixing ratio and an intake air flow rate obtained by the airflow sensor 2 provided in the intake pipe 20. Further, if the same configuration is provided also on the exhaust side, the flow rate of a back flow is calculated allowing judgment of the flow direction.

At low flow rates, although the measurement accuracy is reduced because of a pulsating flow, a favorable measurement response is obtained and a detection temperature of the airflow sensor can be used. Therefore, the present embodiment is advantageous in that an EGR flow rate and a flow direction can be measured with a simple configuration.

Fifth Embodiment

Still another embodiment of the present invention will be explained below with reference to FIGS. 12 and 13.

Figure 12:
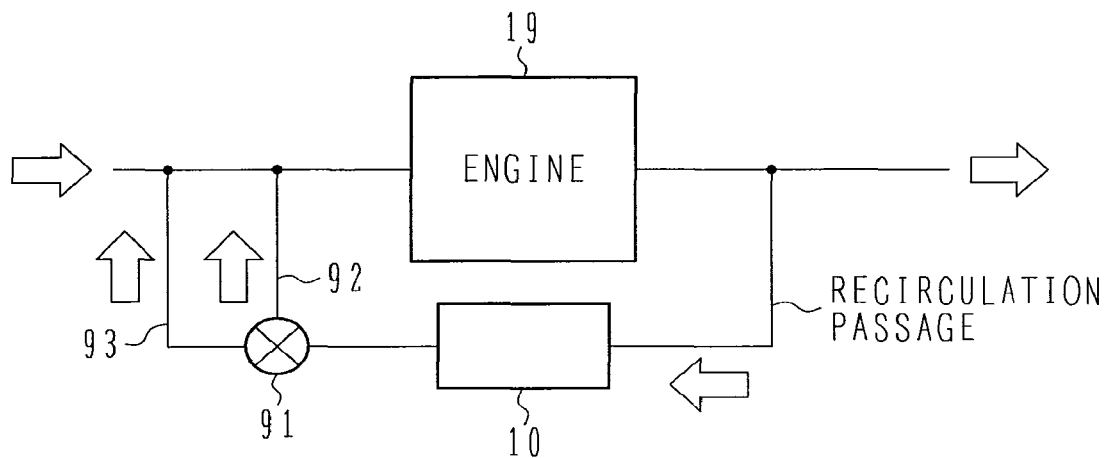
FIG. 12 is a block diagram of an engine control apparatus according to a fifth embodiment of the present invention.

FIG. 12 is a block diagram of an example of a variation of the engine control apparatus shown in FIG. 1. In accordance with the present embodiment, the EGR passage is branched into two passages each having a different pipe length from the branch point to a joint with the intake air passage. Further, a three-way valve is provided at the branch point on the EGR passage to configure an EGR control valve 91. Thereby, the EGR control valve can select any one of three conditions: a condition of passing the EGR gas through a first EGR passage 92, a condition of passing the EGR gas through a second EGR passage 93 having a larger pipe length than the first EGR passage, and a condition of closing the valve to block the EGR gas passage. Configurations not explained are the same as those of FIG. 1.

The control apparatus selects the first or second EGR passage by comparing a pulsation interval detected by the ECU 8 based on an output signal of the airflow sensor 2 with a predetermined threshold value. The use of this method makes it possible to apply inertia effect of EGR gas pulsation, providing an advantage that an operating range for enabling an EGR forward flow can be expanded.

Figure 13:
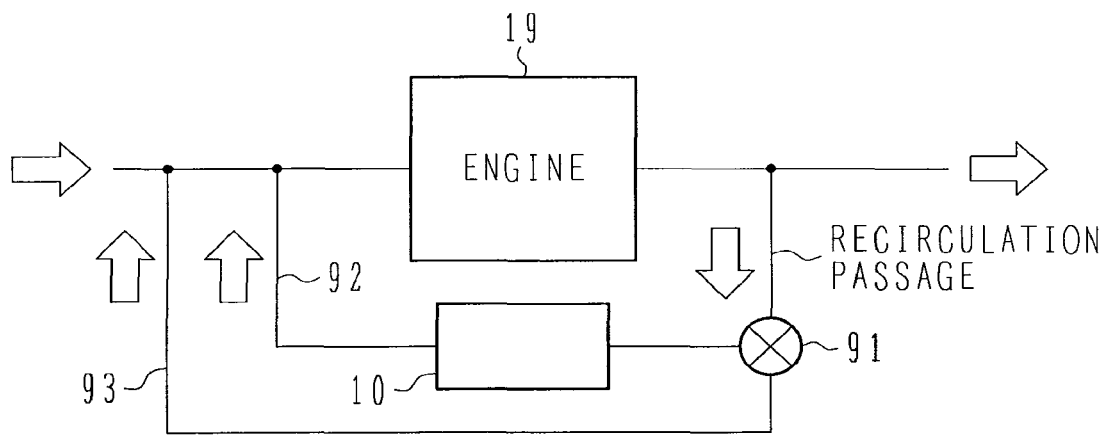
FIG. 13 is a block diagram of an engine control apparatus according to the fifth embodiment of the present invention.

FIG. 13 differs from the embodiment of FIG. 12 in that an EGR gas cooler 10 is provided in one EGR passage after the EGR passage is branched into two by the EGR control valve 91. Configurations not explained are the same as those of embodiments shown in FIGS. 1 and 12. The use of this method makes it possible to provide the same effect as the embodiment of FIG. 12 and also control the temperature of the mixture gas. Further, by providing a gas cooler on only one passage, it becomes possible to select the reduction of the pressure loss caused by the gas cooler.

What is claimed is:

1. A control apparatus of an EGR control valve comprising:
an EGR control valve in an exhaust gas recirculation passage for circulating exhaust gas of an combustion engine from an exhaust gas passage to an intake air passage;
means for measuring a flow rate of EGR gas flowing in the exhaust gas recirculation passage; and
means for controlling by receiving an input from said measuring means and closing said EGR control valve if the EGR-gas flow rate is smaller than a predetermined threshold value in a forward flow condition where the EGR gas is flowing from the exhaust side to the intake side of the internal combustion engine;
wherein said controlling means calculates an approximate expression which expresses the variation of the EGR flow rate based on the EGR-gas flow rate at a plurality of time points, predicts a back flow start time at which the EGR-gas flow rate practically becomes zero based on the approximate expression, calculates the EGR-gas flow rate at a time point which is earlier than the back flow start time by a control time constant of the EGR control valve or more based on the approximate expression, and uses the calculated value as the predetermined threshold value.

2. The control apparatus of an EGR control valve according to claim 1, wherein:
said measuring means is a thermal flow rate measuring apparatus in the exhaust gas recirculation passage.

3. The control apparatus of an EGR control valve according to claim 1, wherein:
said measuring means is an ultrasonic flow rate measuring apparatus in the exhaust gas recirculation passage.

4. The control apparatus of an EGR control valve according to claim 1, further comprising:
means for measuring an intake flow rate;
first means for measuring intake temperature, the first intake temperature measuring means being provided toward the inlet side from a joint of the intake air passage and the exhaust gas circulation passage;
second means for measuring EGR-gas temperature, the second EGR-gas temperature measuring means being provided in the exhaust gas circulation passage; and
third means for measuring temperature of an air-fuel mixture gas containing the intake air and the EGR gas, the third air-fuel mixture gas temperature measuring means being provided toward the internal combustion engine side from a joint of the intake air passage and the exhaust gas circulation passage;
wherein said controlling means calculates a ratio of the EGR-gas flow rate to the intake flow rate based on the intake temperature, the EGR-gas temperature, and the air-fuel mixture temperature, and measures an EGR-gas flow rate based on the measured intake flow rate and the calculated ratio.

5. The control apparatus of an EGR control valve according to claim 1, further comprising:
means for measuring an intake flow rate;
wherein the exhaust gas recirculation passage is provided with a first passage and a second passage having a larger pipe length than the first passage; and
wherein, in a forward flow condition where the EGR gas is flowing from the exhaust side to the intake side of the internal combustion engine, said controlling means selects the first passage if a pulsation interval of a measured intake flow rate is larger than a predetermined threshold value or selects the second passage if the pulsation interval of the measured intake flow rate is equal to or smaller than the predetermined threshold value.

6. The control apparatus of an EGR control valve according to claim 5,
wherein the exhaust gas recirculation passage has a branch point, and the first and second passages are formed so that each of the first and second passages has a different pipe length from the branch point to the intake air passage; and
wherein said EGR control valve is a three-way valve provided at the branch point.

7. The control apparatus of an EGR control valve according to claim 5, wherein:
the first passage is provided with cooling means for cooling the EGR gas.

8. The control apparatus of an EGR control valve according to claim 5, the control apparatus comprising:
temperature measurement means for measuring the temperature of an air-fuel mixture gas containing the intake air and the EGR gas, the temperature measurement means being provided toward the internal combustion engine side from a joint of the intake air passage and the exhaust gas circulation passage; and
cooling means for cooling the EGR gas, the cooling means being provided in the first or second passage;
wherein said control means for controlling the flow rate of EGR gas passing through the first passage and the flow rate of EGR gas passing through the second passage so that the temperature of the air-fuel mixture agrees with a predetermined target value.

* * * * *